United States Patent [19]

Schreiber

[11] 4,285,853
[45] Aug. 25, 1981

[54] CRACK-RESISTANT EPOXY RESIN MOLDING COMPOSITION WITH WOLLASTONITE

[75] Inventor: Bruno Schreiber, Aesch, Switzerland

[73] Assignee: Ciba-Geigy Corporation, Ardsley, N.Y.

[21] Appl. No.: 72,952

[22] Filed: Sep. 6, 1979

[30] Foreign Application Priority Data

Sep. 18, 1978 [CH] Switzerland ............... 9724/78

[51] Int. Cl.$^3$ ............................................. C08L 63/02
[52] U.S. Cl. ............................................. 260/37 EP
[58] Field of Search ................................. 260/37 EP

[56] References Cited

U.S. PATENT DOCUMENTS

| | | | |
|---|---|---|---|
| 3,218,288 | 11/1965 | Warburton | 260/37 EP |
| 3,484,398 | 12/1969 | Childs | 260/37 EP |
| 3,547,871 | 12/1970 | Hofman | 260/37 EP |
| 3,963,666 | 6/1976 | Schreiber et al. | 260/37 EP |
| 3,963,667 | 6/1976 | Schreiber et al. | 260/37 EP |

OTHER PUBLICATIONS

*Chemical Abstracts,* vol. 82, 1975, p. 32, Abstract No. 5040r, Jirgens, L. et al., "Polymeric Composition Containing a Thermoplastic and an Inorganic Filler."

*Primary Examiner*—Paul Lieberman
*Assistant Examiner*—Robert Sellers
*Attorney, Agent, or Firm*—Harry Falber

[57] ABSTRACT

The invention relates to epoxy molding compositions consisting of diglycidyl ethers of bisphenols, anhydride hardeners and reinforcing fillers. At least half the total amount of filler consists of wollastonite. These molding compositions have greater resistance to cracking, which is particularly advantageous in encasing metal parts.

7 Claims, No Drawings

CRACK-RESISTANT EPOXY RESIN MOLDING COMPOSITION WITH WOLLASTONITE

The present invention relates to a curable moulding composition comprising a solid bisphenol-A epoxy resin, a solid dicarboxylic anhydride hardener and reinforcing fillers, chiefly wollastonite.

Because of their advantageous properties, expoxy resin moulding compositions have recently acquired a wide diversity of uses in the art. For economic and production reasons, there is often a desire for solid, flowable and storable epoxy resin compositions. A particular suitability for specific end uses arises from the choice of basic constituents, namely resin and hardener. Further modifications are often made by the addition of aggregates, whereby an improvement in the mechanical, electrical and also processing properties is achieved.

The use of such aggregates can substantially influence the curing of the moulding composition, which is often a drawback. For example, basic aggregates can so reduce the reactivity during curing with the anhydride that the production of mouldings is no longer possible. A quick curing, however, can promote cracking in the mouldings.

Epoxy resin moulding compositions have acquired particular importance in the electrotechnical industry, as they generally meet the requirements made of them. The resistance to cracking of mouldings made from epoxy resin moulding compositions containing reinforcing fillers, especially of encased heavy metal components, is still regarded as insufficient. Good resistance to cracking is a prerequisite for permanent protection of the casing. Cracking can occur during or after removal, cooling, storage or use of the mouldings.

The present invention has for its objection the provision of a solid, quick curing epoxy resin moulding composition which can be easily processed and from which mouldings having very good resistance to cracking and good mechanical properties can be obtained.

Accordingly, the invention provides an epoxy resin moulding composition consisting of an epoxy resin which contains more than 1 epoxide equivalent per kg of epoxy resin and is solid at room temperature, a solid anhydride hardener in an amount such that the number of anhydride groups per epoxy group is 1.5 to 0.5, and one or more fillers in an amount between 50 and 80% by weight, based on the moulding composition, wherein
 (a) the epoxy resin is one based on diglycidyl ethers of bisphenols,
 (b) the hardener is an anhydride of a dicarboxylic acid, and
 (c) at least half of the total amount of filler consists of wollastonite.

The epoxy resins based on bisphenol/diglycidyl ethers have long been known. They are glycidylation products of bisphenols and comprise pure and oligomer diglycidyl ethers and mixtures thereof. Suitable bisphenols may have the formula

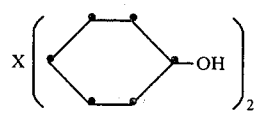

wherein X represents oxygen, sulfur, alkylidene, cycloalkylidene, alkylene or a direct bond. Examples are ethylidene, propylidene, butylidene, pentylidene, hexylidene, monochloro-, dichloro- or trichloroethylidene, cyclohexylidene, methylene, ethylene, phenylmethylene or diphenylmethylene. Preferred bisphenols are bisphenol F, bisphenol C and, in particular, bisphenol A. Further suitable phenols are phenol or cresol novolaks. The epoxy resin has preferably an epoxide equivalent per kg of resin between 1 and 2.5, in particular between 1.5 and 2, and it softens preferably only above 50° C. Bisphenol diglycidyl ethers can also be employed in the form of adducts, e.g. with polyamines or polycarboxylic acids. They can also be mixed with small amounts, e.g. up to 20% by weight, of other epoxy resins, for example polyglycidyl ethers, polyglycidyl esters, glycidyl compounds based on hydantoin or glycidyl isocyanurate. Halogen-containing epoxy resins based e.g. on glycidyl ethers of tetrachloro- or tetrabromobisphenol A can also be used for providing a flameproof finish.

One or more dicarboxylic anhydrides can be used as hardener. The anhydrides should be relatively stable to hydrolysis to ensure an adequate storage life. Anhydrides of carbocyclic 1,2-dicarboxylic acids are suitable hardeners. They can contain 5 or 6 ring carbon atoms. Examples of such anhydrides are tetrahydrophthalic anhydride, hexahydrophthalic anhydride and tetrachlorophthalic anhydride. The hardeners can also be employed in the form of melts in polyols, for example in cresol novolaks.

If mixtures of different anhydrides are used, it can be advantageous to add one in the form of an adduct. The content of hardener is preferably so adjusted that there is 0.6 to 0.9 anhydride group per expoxide group.

The wollastonite used as filler is a naturally occurring and commercially available calcium metasilicate whose aqueous extract (24 hours) shows basic reaction. This filler comprises preferably at least two thirds, in particular at least three quarters, of the total amount of filler and can also be used alone as filler.

Suitable fillers which can be employed in addition to wollastonite are e.g.: textile, glass, asbestos, boron and carbon fibres, powdered glass, glass beads, quartz flour, powdered quartz glass (crystalline amorphous quartz flour), mineral silicates such as mica, asbestos flour, powdered slate, kaolin, aluminium trihydroxide, powdered chalk, gypsum, antimony trioxide, bentonite, silica gel (aerosil), lithopone, barium sulfate, titanium dioxide, carbon black, graphite, oxide pigments, e.g. iron oxide, or metal powders, such as aluminium or iron powder. Conductive fillers should be avoided when using the moulding compositions in the electrotechnical industry.

A preferred moulding composition contains 50 to 70% by weight of wollastonite and up to 20% by weight of a further filler, in particular glass fibres.

In addition to the fillers, conventional modifiers can be added to the epoxy moulding compositions of the invention before curing in any phase. Examples of such modifiers are dyes, pigments, levelling agents, thixotropic agents, mould release agents, adhesion promoters between fillers and resin, flame retardants, such as halogen compounds with or without antimony trioxide, and also other synthetic resins, such as phenolics and aminoplasts.

The epoxy moulding compositions can be obtained in conventional manner with the aid of known mixing devices (e.g. stirrers, kneaders, rolls and mills). Thus, for example, it is possible to mix the individual components with one another intensively, optionally after they have been ground beforehand (dry method). However, mixing can also be effected in a kneader to produce a granulate.

The solid epoxy moulding compositions of the invention can be processed to mouldings of all kinds by conventional methods with curing. The curing temperature is normally between 50° and 200° C., preferably between 100° and 180° C. Moulding compositions for processing by moulding methods are especially suitable. The moulding compositions are used for producing high grade mouldings, in particular in the electrotechnical industry. Metal components for example can be encased easily with these moulding compositions.

The epoxy moulding compositions of the present invention are free flowing, readily storable and surprisingly quick-curing moulding compositions which can be easily processed. Mouldings obtained therewith have good mechanical properties and an exceedingly good resistance to cracking.

The following Examples illustrate the invention in more detail.

Examples 1 to 4 and Comparison Examples 800 g of a solid bisphenol A resin (1.7 epoxide equivalents/kg, melting point 74° C., measured on the Kofler bench), 800 g of a hardener A (obtained by mixing 350 g of tetrachlorophthalic anhydride, 50 g of a solid adduct of 50% by weight of hexahydrophthalic anhydride and 50% by weight of cresol novolak, and 600 g of natural wollastonite in a 5 liter ball mill for 15 hours), 2336 g of natural wollastonite, 44 g of zinc stearate and 20 g of gas black are charged into a laboratory impeller mixer and homogenised for 2 minutes at a speed of 1400 c/min. This pre-mix is fused and kneaded in a laboratory Ko-kneader at 100° C. cylinder temperature. The composition is cooled and ground to a granulate. The test mouldings are made from this moulding composition at 170° C. mould temperature and a curing time of 10 minutes.

Hardeners B and C used in Examples 3 and 4 respectively are obtained as follows:

Hardener B: 3.5% by weight of tetrachlorophthalic anhydride, 3% by weight of hexahydrophthalic anhydride, 2% by weight of novolak and 60% by weight of quartz flour are ground for 5 hours in a ball mill.

Hardener C: as for B, except that tetrahydrophthalic anhydride is used instead of hexahydrophthalic anhydride.

The bending strength (DIN 53 452) and dimensional stability under heat by the Martens' method (DIN 53 458) are determined using test rods measuring 10×15×120 mm.

The resistance to cracking is determined as follows:

Two small steel plates measuring 4×30×60 mm, which have been degreased with methylene chloride, are initially preheated in the mould which has a temperature of 170° C. Then one side is coated with a 1.5 mm layer and the other with a 2.5 mm layer of moulding composition by the transfer moulding method. The moulding compostion is used in the form of tablets weighting 60 to 70 g. The moulding is so coated that, on adjacent sides, two corners of the metal plate separated by epoxy resin are not encased. The moulding time is 3 minutes, after which the mouldings are cooled to room temperature.

The classification of the resistance to cracking follows from the cooling tests, which are summarised in Table 1.

TABLE 1

| | |
|---|---|
| cracks within 1 hour after removal from mould | 5 |
| cracks within 4 hours | 4 |
| cracks within 24 hours | 3 |
| cracks on cooling from room temperature to 0° C. in ice water (¼ hour) | 2 A |
| cracks after ¼ hour on heating at 100° C. and cooling to 0° C. in ice water (¼ hour) | 2 B |
| cracks after cooling from room temperature to −20° C. (¼ hour in alcohol/dry ice) | 1 A |
| cracks after cooling from room temperature to −40° C. (¼ hour in alcohol/dry ice) | 1 B |
| no cracks after all shock stages | 0 |

The test results are reported in Table 2. The test mouldings for Example 2 and the comparison Examples are obtained according to Example 1.

TABLE 2

| Composition (% by weight) and test results | Example 1 | Example 2 | Example 3 | Example 4 | Comparison Example | Comparison Example |
|---|---|---|---|---|---|---|
| epoxy resin | 20 | 20 | 21.5 | 21 | 20 | 20 |
| hardener A | 20 | 20 | — | — | 20 | 20 |
| hardener B | — | — | 21.3 | — | — | — |
| hardener C | — | — | — | 21 | — | — |
| natural wollastonite | 58.4 | 47.4 | 44.5 | 56.3 | — | — |
| quartz flour | — | — | — | — | 58.4 | 47.4 |
| glass fiber | — | 11 | 11.0 | — | — | 11 |
| zinc stearate | 1.1 | 1.1 | 1.1 | 1.3 | 0.5 | 0.5 |
| resistance to cracking | 0 | 0 | 0 | 0 | 3 | 1A |
| bending strength (N/mm²) | 147.2 | 162.1 | 150 | 139 | 153.7 | 161.5 |
| dimensional stability to heat (°C.) by the Martens' method | 98 | 99 | 98 | 95 | 101 | 93 |

What is claimed is:

1. An epoxy resin moulding composition consisting of an epoxy resin which contains more than 1 epoxide equivalent per kg of epoxy resin and is solid at room temperature, a solid anhydride hardener in an amount such that the number of anhydride groups per epoxy group is 1.5 to 0.5, and one or more fillers in an amount between 50 and 80% by weight, based on the moulding composition, wherein
  (a) the expoxy resin is one based on diglycidyl ethers of bisphenols,
  (b) the hardener is an anhydride of a dicarboxylic acid, and
  (c) at least half of the total amount of filler consists of wollastonite.

2. A moulding composition according to claim 1, wherein the hardener is the anhydride of a carbocyclic 1,2-dicarboxylic acid.

3. A moulding composition according to claim 1, wherein the hardener is tetrahydrophthalic, hexahydrophthalic or tetrachlorophthalic anhydride or one of the mixtures of these anhydrides.

4. A moulding composition according to claim 1, wherein at least two thirds of the total amount of filler is wollastonite.

5. A moulding made from an epoxy moulding composition according to claim 1.

6. A moulding according to claim 5, which consists of a metal component and of the cured epoxy moulding compositions encasing said metal component.

7. A method for the production of mouldings which comprises introducing the epoxy resin molding composition according to claim 1 into a cavity and curing said composition at elevated temperatures in order to achieve the desired mold form.

* * * * *